MINIATURE DIAL

Filed Oct. 23, 1965 3 Sheets-Sheet 1

INVENTOR
D. W. HAGELBARGER
BY [signature]
ATTORNEY

Dec. 17, 1968 D. W. HAGELBARGER 3,417,208

MINIATURE DIAL

Filed Oct. 23, 1965 3 Sheets-Sheet 3

United States Patent Office 3,417,208

Patented Dec. 17, 1968

3,417,208

MINIATURE DIAL

David W. Hagelbarger, Morris Township, Morris County, N.J., assignor to Bell Telephone Laboratories, Incorporated, New York, N.Y., a corporation of New York Filed Oct. 23, 1965, Ser. No. 503,121
16 Claims. (Cl. 179—90)

ABSTRACT OF THE DISCLOSURE

A space saver telephone dial which is arranged so as to allow the finger-hole opening being used, to expand, to accommodate the dialing finger, while the rest of the finger holes remain in their elliptical form. Three embodiments of the invention show three mechanical ways to obtain a small dial by having the finger holes initially in an elliptical form each of which changes to a substantially circular form upon the urging of a dialing finger into the finger recess of the dial.

This invention pertains to digit selecting devices and relates specifically to telephone dials.

Broadly, the object of this invention is to reduce the size of such devices.

Apparatus to which this invention relates comprises manually operated equipment for generating coded pulses. In the field of telephony, for example, one such item of equipment is a dial mounted on a telephone instrument. When operated by a finger, the dial causes pulses corresponding to a selected digit to be generated.

Much engineering effort has been devoted in recent years to reducing the size of pulse generating equipment. In the telephone industry this trend is reflected in telephone instruments which have become smaller and more compact.

Reduction in the size of such equipment, however, has been impeded by certain problems. For example, any component in the equipment which becomes irreducible in size ultimately limits the amount by which the overall size of the equipment can be reduced. Specifically, in telephone instruments, the dial is a size-limiting component.

Reduction in dial size is limited principally by the size of the finger holes therein. The finger holes, in turn, must be kept large enough to accommodate a finger or other device for activating the dial. In determining what size hole is large enough to accommodate a finger or other operator, convenience and accuracy in the use thereof must be considered in addition to the physical size of fingers.

Thus, it is a specific object of this invention to reduce the size of telephone dials without adversely affecting convenience and accuracy in the use thereof.

It is another specific object of this invention to reduce the diameter of telephone dials without reducing the size of the operative finger holes.

According to one feature of this invention, all of the operating holes in a digit selecting device such as a telephone dial are expandable from a quiescent size to an operating size. Expansion of an operating hole occurs in response to the insertion of a finger or other operator. As a result, the spacing between adjacent holes is reduced while the size of any selected operating hole is not.

One embodiment of this invention comprises a telephone dial having a rim and a post separated by an annular space containing a plurality of rotatable spoke members radiating out from the post. Each spoke member comprises a back part attached to the post and a flat front part extending radially from the post to the rim. The two edges of each flat front part have crescent shaped portions of material removed therefrom so that an elliptical shaped hole is formed when the front part of two adjacent spoke members abut. Thus, a plurality of adjacent elliptically shaped holes form a ring around the face of the dial.

All of the spoke members, however, are spaced around the dial rim in such a manner that the elliptical hole between the front parts of any two adjacent spoke members can be expanded to a circular shape in response to the insertion therein of a finger or other operator. Since the center to center distance between elliptical holes is less than the center to center distance between circular holes, the dial diameter is reduced. However, since any elliptical hole into which a finger is inserted expands to a full circle, its operating size is not reduced. Thus, in this embodiment of the invention, dial size is reduced without seriously affecting accuracy or convenience in the use thereof.

Other objects and features of this invention will be more fully understood from the following description when taken in conjunction with the accompanying drawing in which.

Figure 2:
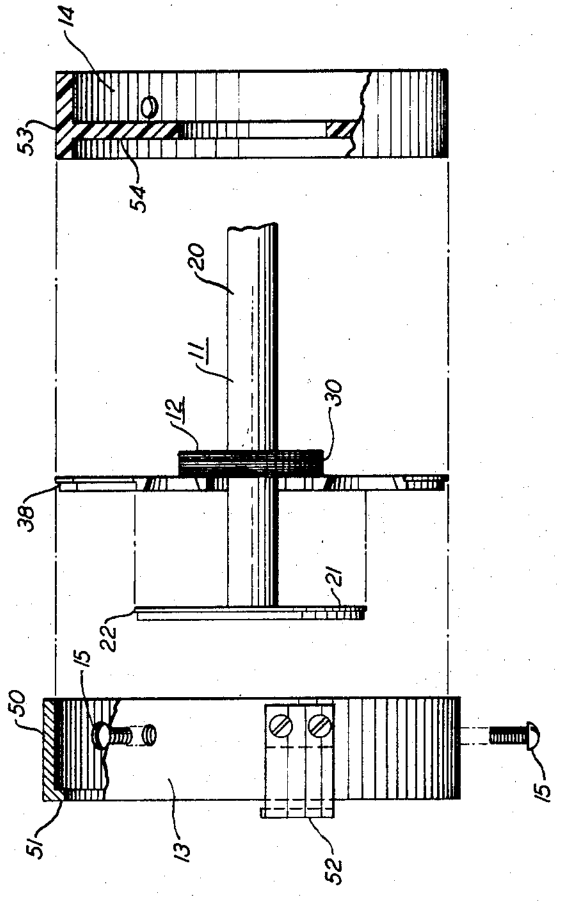
FIG. 2 is an exploded view taken in elevation of the digit selecting device shown in FIG. 1.
Figure 1:
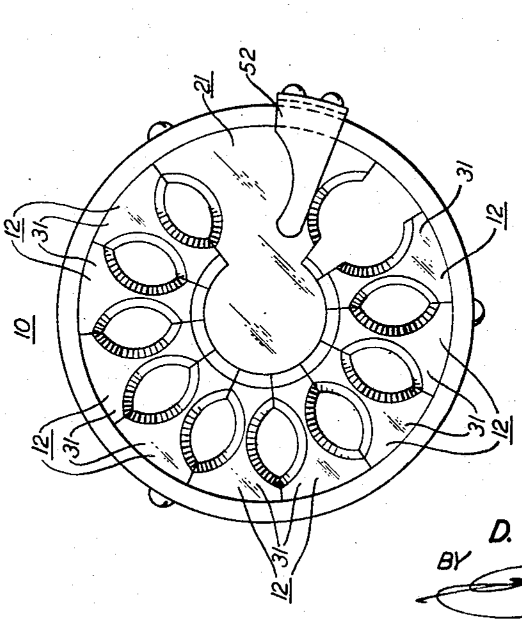
FIG. 1 is a plan view of a digit selecting device constructed in accordance with this invention.

Referring now to FIGS. 1 and 2, there is disclosed therein a dial 10 having a reduced diameter. The dial 10, as shown in detail in FIG. 2, comprises a center post 11, a plurality of spoke members 12, an outer spacer 13, and an inner spacer 14. The spoke members 12 are mounted rotatably on the center post 11 and the center post 11 fits in the outer spacer 13 and is held in place by the inner spacer 14. The inner spacer 14, in turn, is held in the outer spacer 13 by a plurality of screws 15.

Figure 3:
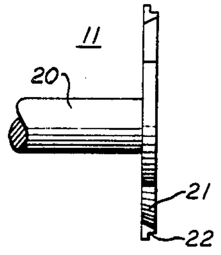
FIG. 3 is an elevation view of a center post used in the digit selecting device shown in FIG. 2.
Figure 4:
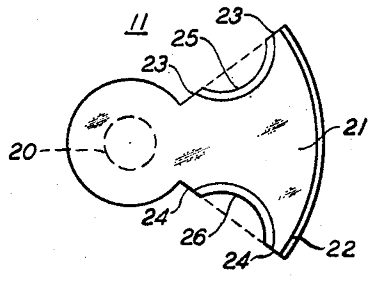
FIG. 4 is a plan view of the center post shown in FIG. 3.

The center post 11, as shown in FIGS. 3 and 4, can be conveniently made from aluminum and comprises a shaft 20 integrally attached to a spoke stop 21. The shaft 20 connects the dial 10 to a pulsing mechanism (not shown). In the embodiment illustrated, the shaft 20 is cylindrical but may take any other convenient form.

The spoke stop 21 has a curved lip 22 and two edges 23 and 24. The lip 22 is arranged to slide between the outer spacer 13 and the inner spacer 14, and the two edges 23 and 24 are directed radially toward the outer spacer 13 from the shaft 20.

As shown in FIG. 4, material is removed from the edges 23 and 24 so that each includes a concave curved section; viz., section 25 on the edge 23 and section 26 on the edge 24. Advantageously, each of the sections 25 and 26 is crescent shaped so that a finger or other dial operator can be conveniently and comfortably engaged. The remaining portions of the edges 23 and 24, however, are straight and are adapted to engage corresponding portions on adjacent spoke members.

A plurality of spoke members 12 are shown in FIG. 2 and each can be conveniently made from a material such as aluminum. All, moreover, are identical so a description of one serves to describe the rest.

Figure 5:
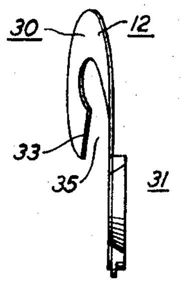
FIG. 5 is an elevation view of a spoke member used in the digit selecting device shown in FIG. 2.
Figure 6:
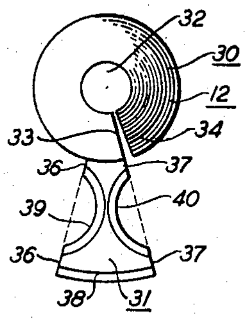
FIG. 6 is a plan view of the spoke member shown in FIG. 5.

As shown in FIGS. 5 and 6, each spoke member 12 comprises a back part 30 and a front part 31. The back part 30 is conveniently circular in shape, has a hole 32 in the center and is cut through its periphery at one place so as to form two ends 33 and 34. Furthermore, for reasons which will be explained later, the back part 30 is twisted so that the ends 33 and 34 are separated from each other by a space 35.

The front part 31 has a shape similar to that of the spoke stop 21. It extends radially out from the back part 30 from a position adjacent to the end 33 and includes two edges 36 and 37 and a lip 38. The lip 38 follows a convex curve and is arranged to slide between the outer spacer 13 and the inner spacer 14. As shown in FIG. 6, material is removed from the edges 36 and 37 so that each includes a concave curved section; viz., section 39 on the edge of 36 and section 40 on the edge of 37. For the reasons explained in describing the spoke stop 21, each of the sections 39 and 40 advantageously defines a crescent shape.

As shown in FIG. 2, the spoke members 12 are assembled on the center post 11. In the course of assembling the spoke members 12 on the center post 11, the back part 30 is slipped over the shaft 20. The first spoke member to be assembled on the shaft 20 abuts the spoke stop 21 and subsequent spoke members abut one another. As the subsequent spoke members are assembled on the center post 11, however, the twist which separates the ends 33 and 34 permits each spoke member to be rotated so that its end 33 slips between the back parts of the preceding spoke members. Thus, when all of the spoke members are assembled on the center post 11, all of the back parts 30 are interleaved.

When all of the spoke members 12 are assembled on the center post 11, the front parts 31 thereof and the spoke stop 21 all lie in a common plane. As can be seen from FIG. 1, the front parts 31 and the spoke stop 21 are disposed around the center of the center post 11 in such a fashion that one substantially circular opening and nine elliptical openings are formed.

The front parts 31 and the spoke stop 21 are held in their common plane by the interaction of the inner spacer 14 and the outer spacer 13. The outer spacer 13 can be made conveniently from aluminum and, as shown in FIG. 2, comprises a cylinder 50 having an inner lip 51 at one end. Furthermore, the cylinder 50 contains several holes adapted to receive the screws 15 and has mounted thereon a finger stop 52. When properly assembled, the front parts 31 and the spoke stop 21 fit inside the cylinder 50 with the lip 38 on each front part 31 and the lip 22 on the spoke stop 21 seated on the lip 51.

The inner spacer 14 is adapted to slide into the outer spacer 13 and hold the front parts 31 and the spoke stop 21 against the lip 51. The inner spacer 14 can be conveniently made of a material such as Teflon. As shown in detail in FIG. 2, it comprises a cylinder 53 having a flange 54 recessed in one end and several tapped holes to accommodate the screws 15 which extend through the outer spacer 13.

The flange 54 is recessed into the cylinder 53 to allow clearance for a dial operator such as a finger. Furthermore, the surface of the flange 54 can be used to provide information regarding dial usage such as numbers associated with finger holes. Finally, the flange 54 is disposed adjacent to the end of the cylinder 53 which holds the spoke members 12 and the spoke stop 21 against the lip 51. Advantageously, that end of the cylinder 53 presents a small and substantially friction free surface to the spoke members 12 and the spoke stop 21 so that they may slide easily thereon.

In operation, a finger tip or other dial operator is inserted into one of the elliptical openings between two spoke members 12 or between a spoke member 12 and the spoke stop 21. The inserted finger or operator expands the elliptical opening by shifting the position of the spoke members 12 around the flange 54 in the inner spacer 13. When the selected opening is fully expanded, the spoke stop 21 and all of the spoke members 12 abut each other except for those adjacent to the expanded opening. FIG. 1 illustrates a typical situation wherein the opening adjacent to the finger stop 52 has been expanded.

Next, the finger or operator rotates the spoke member 12 adjacent to the expanded opening. As the spoke members between the opening and the spoke stop 21 all abut each other, they follow the spoke member being rotated and thereby cause the spoke stop 21 to rotate also.

Rotation of the spoke stop 21 rotates the center post 11 and thereby activates the pulse generating equipment to which the center post 11 is connected. Rotation continues until the finger or other operator reaches the finger stop 52. Thereafter, the finger or operator is removed from the hole and the spoke stop 21 then returns to its starting position in a conventional manner. It will be understood that pulse generation may occur either as the spoke stop 21 is rotated initially or as it returns to its starting position.

Figure 7:
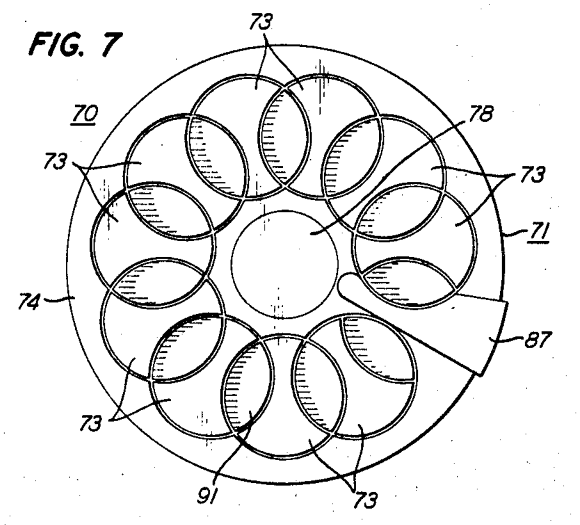
FIG. 7 is a plan view of another digit selecting device constructed in accordance with this invention.
Figure 8:
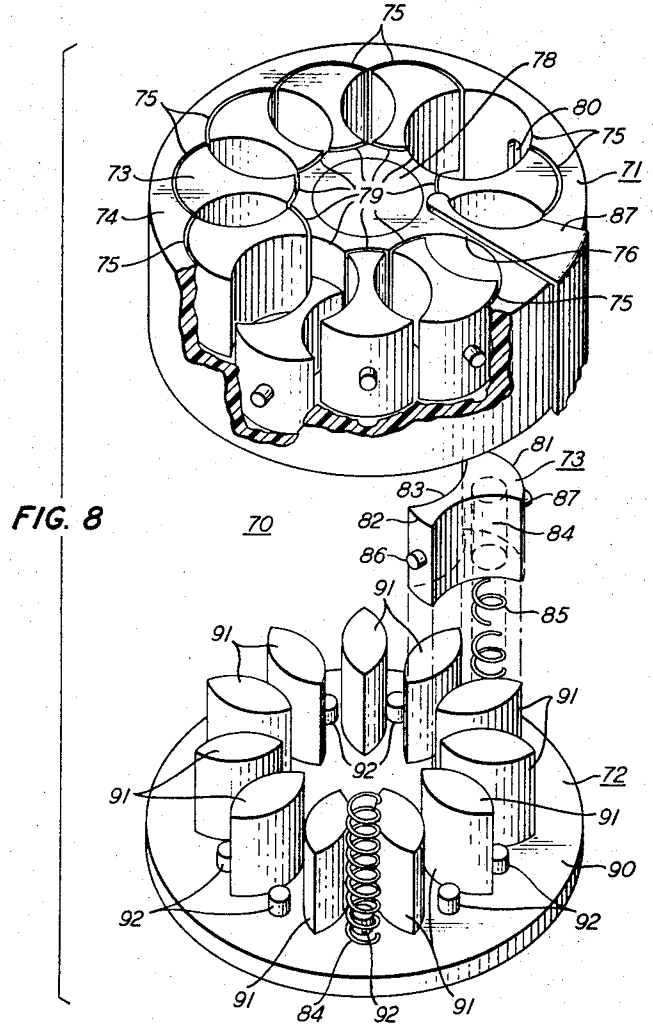
FIG. 8 is an exploded view taken in elevation of the digit selecting device shown in FIG. 7.

Another advantageous form of this invention is embodied in the dial 70 illustrated in FIGS. 7 and 8. As shown in detail in FIG. 8, the dial 70 comprises three main components; viz., a housing 71, a plate 72, and a plurality of slide members 73 adapted to reciprocate in the housing 71 with respect to the plate 72.

The housing 71 is the first component in the dial 70 and comprises a hollow cylinder 74 having a plurality of grooves 75. The grooves 75 are disposed around the inner circumference of the cylinder 74 and terminate on opposite sides of a projection 76. The projection 76 terminates in a center member 78. The perimeter of the center member 78 includes a plurality of linked grooves 79. The cylinder 74 and the projection 76 may conveniently be manufactured as a unitary assembly. Furthermore, the entire assembly can be conveniently made of aluminum, plastic, or other material which is resistant to friction wear. Finally, each of the grooves 75 and each of the grooves 79 includes a slot 80.

The slide members 73 are the second component of the dial 70 and they are adapted to slide in the housing 71. All of the slide members 73 are identical, so a description of one suffices as a description of all. Each slide member 73 slides between a groove 75 on the cylinder 74 and a groove 79 in the projection 76 and has two sides 81 and 82 curved to respectively correspond to the surfaces of the grooves. Specifically, the curved side 81 fits in a groove 75 in the cylinder 74, while the curved side 82 fits in a groove 79 in the projection 76.

The curved sides 81 and 82 are interconnected by two other sides 83 and 84. The sides 83 and 84 are curved to cooperate with the curvature of the grooves 75 in the cylinder 74 and the grooves 79 in the projection 76. Advantageously, each side cooperates with a groove 75 on the cylinder 74 and a groove 79 on the projection 76 to define a portion of the circumference of a circle.

In addition, the slide member 73 has a hole in one end for receiving one of a plurality of springs 85. Furthermore, the curved sides 81 and 82 are equipped with a pair of pins 86 and 87. The pins 86 and 87 cooperate with the slots 80 to guide the slide member 73 as it slides in the housing 71. Finally, the slide member 73 is advantageously made from a wear-resistant material such as plastic or aluminum.

The third and last component of the dial 70 is the plate 72 which fits against one end of the cylinder 74 and holds the slide members 73 in place. As shown in FIG. 8, the plate 72 comprises a flat disk 90, a plurality of bosses 91 distributed around its circumference, and a plurality of pins 92. The pins 92 are interspersed among the bosses 91 and locate the springs 85 in the assembled dial 70.

Each boss 91 has two sides. Conveniently, the sides are curved so as to join each other at their ends. The curvature of the sides, moreover, advantageously follows the curvature of the sides 83 and 84 on the slide members 73. As a consequence, the sides on each slide member 73 fit between adjacent bosses 91 and are thereby aligned as the slide member 73 slides back and forth.

As shown in FIG. 7, the slide members 73 define a plurality of elliptical holes spaced around the housing 71 when they are assembled in the cylinder 74. Furthermore, as shown in FIG. 8, the springs 85 and the slots 80 cooperate to bias the slide members 73 to a position wherein the top surface of each lies in approximately the same plane and all are substantially flush with the end of the cylinder 74. Finally, the slide members 73 are further restrained against unaligned movement by the interaction between the pins 86 and 87 and the slots 80.

In operation, a finger or other operator depresses a slide member 73. As a result, the elliptical opening on either side of the depressed slide member 73 expands to form a single opening substantially circular in shape.

When the slide member 73 is fully depressed, its surface is flush with the top surface of the adjacent bosses 91. Thus, the inserted finger or operator bottoms on a substantially regular surface.

Once the selected slide member 73 has been depressed, the inserted finger or operator engages the adjacent slide member and rotates the housing 71 and, consequently, the center member 78. The center member 78 is attached to a pulse generating source (not shown) while the housing 71 is associated with a finger stop 88.

The housing 71 continues to rotate until the finger or operator engages the finger stop 88. Thereafter, the finger or operator is removed from the slide member 73 thereby allowing the housing 71 to return to its starting position. Pulses are generated either as the housing 71 is rotated by the finger or as the housing 71 returns to its starting position.

The foregoing embodiment may easily be modified to ease manufacturing difficulties. For example, the slide members 73 can be assembled as two parts; viz., one part wherein every other slide member 73 is joined to form a unitary assembly and one part wherein the remaining slide members 73 are joined to form another unitary assembly.

Figure 9:
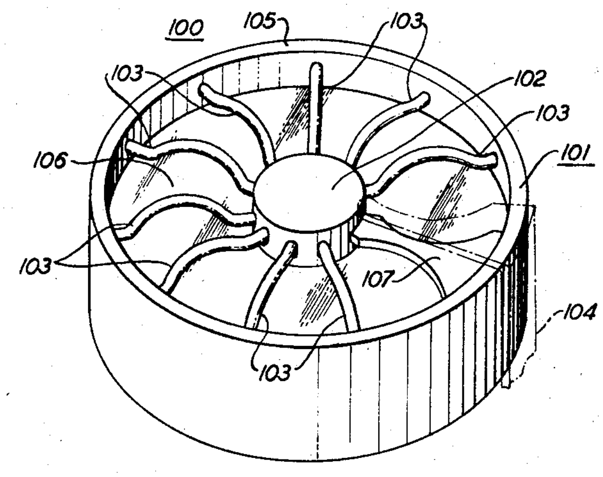
FIG. 9 is a perspective view of another digit selecting device constructed in accordance with this invention.

Still another advantageous form of the invention is embodied in a dial 100 shown in FIG. 9. As illustrated therein, the dial 100 comprises three parts, viz., a housing 101, a center member 102, and a plurality of spoke members 103 wherein the spoke members 103 are separated by a plurality of small spaces. Furthermore, a finger stop 104 is mounted adjacent to the dial 100.

The housing 101 comprises a cylinder 105 having a flange 106 extending out from the inner wall thereof. The cylinder 105 and the flange 106 may conveniently be manufactured as a single assembly and they can be made of any wear-resistant material such as aluminum or plastic.

The center member 102 is a cylinder or hub located in the center of the housing 101. The center member 102 can also be made of any wear-resistant material such as aluminum or plastic. Furthermore, it can be attached directly to the flange 106 or, as shown in FIG. 9, it can be separately mounted above the flange 106 by a projection 107.

Either the center member 102 or the flange 106 is attached to a shaft (not shown) which, in turn, is connected to any convenient pulse generating source of the type which generates pulses when it is rotated. In the embodiment illustrated in FIG. 9, the flange 106 contains a hole (not shown) and the center member 102 is attached to the shaft which extends through the hole.

The spoke members 103 radiate out from the center member 102 toward the inner wall of the housing 101 and all are identical. Thus, a description of one suffices for all.

Each spoke member 103 extends between the center member 102 and the inner wall of the housing 101 and is advantageously made of a material which can be twisted 90 degrees and then return unaided to its initial position when released. As illustrated in FIG. 9, one end of the spoke member 103 is rigidly attached to the housing 101 and the other end is rigidly attached to the center member 102. The central portion of the spoke member 103, moreover, is curved and the curvature is such that when two spoke members which are adjacent to each other are twisted 90 degrees in opposite directions, the curved portions will comprise segments of a circle common to both.

In operation, a finger or other operator is inserted into the small space between two spoke members 103 or between a spoke member 103 and the projection 107. When the finger is inserted into the small space, both spoke members twist in opposite directions and thereby form an enlarged opening substantially circular in shape. Similarly, when a finger or other operator is inserted between a spoke member 103 and the projection 107, the spoke member 103 twists 90 degrees away from the projection 107 and cooperates with a curved section of the projection 107 to form a substantially circular large opening.

Next, the finger or other operator rotates the housing 101 until the finger stop 104 is reached. Thereafter, the finger is removed to enable the housing 101 to return to its starting position. Dial pulses are generated in a conventional manner as the housing 101 winds up or as it unwinds.

In summary, three different embodiments have been disclosed wherein reduced dial diameters have been obtained without loss of convenience or accuracy in the use thereof. These embodiments, however, merely illustrate the principles of this invention and many other embodiments which do not depart from the spirit and scope of the invention will occur to those skilled in theh art.

What is claimed is:

1. In a digit selecting device requiring openings therein of predetermined size, a plurality of openings expendable from a quiescent size to said predetermined size in response to the insertion therein of an operator, said openings being disposed adjacent to each other in such a manner that the space circumscribed by the perimeter formed by one opening when expended to said predetermined size overlaps the space circumscribed by the perimeter formed by an adjacent opening when expanded to said predetermined size whereby the center to center spacing between adjacent openings is reduced without reducing below said predetermined size any opening in which an operator is inserted.

2. In a dialing device, a plurality of openings expendable from a qiuescent size to an operating size in response to the insertion therein of an operator, said openings beirg centered side by side on a path having a length less than the distance which is equal to the sum of the diameters of said openings when measured along said path with each opening expanded to said operating size.

3. In a digit selecting device, the combination comprising:

means for selecting digits in response to movement by an operating member, said means including a plurality of expendable openings;

and means for expanding each opening from a quiescent size to an operating in response to the insertion therein of said operating member, said openings being disposed adjacent to each other in such a manner that the space circumscribed by the perimeter formed by one opening when expanded to said operating size overlaps the space circumscribed by the perimeter formed by an adjacent opening when expanded to said operating size whereby the center to center spacing between adjacent openings is reduced without reducing below said operating size any opening in which an operating member is inserted.

4. In a device for selecting digits, the combination comprising:

an inner support;

an outer support;

and a plurality of members disposed side by side between said inner and outer supports, said members having sides shaped to form an opening of a first size between adjacent members and being movable between said inner and outer supports and spaced from each other in such a manner that one first size opening at a time can be expanded to a second larger size.

5. A device in accordance with claim 4 wherein said inner support and said outer support comprise a shaft and an outer rim, respectively, and said plurality of members comprise a plurality of spokes extending radially from said shaft to said rim.

6. A device in accordance with claim 5 wherein said first sized holes are elliptical in shape and said second sized holes are circular in shape.

7. In a dialing device, the combination comprising:

a plurality of spoke members wherein each spoke member includes a back portion containing a hole and a front portion having two concave edges and a convex edge linking said concave edges, said spoke members being arranged with the back portions in register and interleaved with each other and with all of the front portions lying adjacent to each other in a common plane;

a center member having a shaft and a spoke stop, said shaft extending through the holes in the back portions of said spoke members and said spoke stop having two concave edges and a convex edge linking said concave edges and being disposed in said common plane with the front portions of said spoke members;

an outer sleeve surrounding said spoke members and said center member and having a lip at one end, said lip being curved to accommodate the convex edges on said spoke members and said spoke stop;

and an inner sleeve situated within said outer sleeve for pressing said spoke members against said lip.

8. In a dialing device, the combination comprising:

a first member having a flange abutting a shaft;

a plurality of second members wherein each second member has a flange, said second members being stacked rotatably on said shaft with each flange lying in a plane containing the flange on said first member, each flange being spaced from the others in said plane to form a circle of holes wherein one hole is substantially larger than the rest;

and means for holding said flanges in said plane.

9. In a dialing device, the combination comprising:

a sleeve member having an inner wall circumscribed by a flange;

a plurality of spoke members wherein each spoke member includes a back portion and a front portion, said back portion containing a hole and said front portion having two concave edges linked by a convex edge, said front portions being disposed side by side on said flange with the convex edge of each in close proximity to said inner wall;

a center member having a shaft and a spoke stop, said shaft extending through the holes in the back portion of said spoke members and said spoke stop being disposed on said shaft and having two concave edges linked by a convex edge disposed on said flange in close proximity to said inner wall;

and means for holding said spoke members and said spoke stop on said flange in an arrangement wherein the aggregate length of the convex edge of said spoke stop and the convex edges of said spoke members is less than the arcuate length of said inner wall measured adjacent to said flange whereby any hole defined by adjacent concave edges is expandable to a larger size.

10. In a dialing device, the combination comprising:

a first member, said first member having an open portion;

a second member;

means for positioning said second member in the open portion of said first member;

a plurality of third members disposed between said first member and said second member, each of said third members being arranged to reciprocate in said first member between a first position and a second position and adapted to move said first member when in said first position;

and means for guiding said third members as they reciprocate between said first and second position.

11. In a dialing device, the combination comprising:

a rotatable housing containing a cylindrically shaped opening;

a shaft having a cylindrical shape;

means for locating said shaft within the opening in said housing;

a plurality of guides wherein some of said guides are disposed around the sides of the opening in said housing and the remaining are disposed around the outside of said shaft, all of said guides being arranged in pairs wherein one guide is disposed in said housing and the other is disposed in said shaft;

and a plurality of mmebers wherein each member is arranged to reciprocate in one of said pairs between a first position and a second and is adapted to rotate said housing when in said first position.

12. In a device responsive to operation by a finger or other operator:

a movable first member;

a second member disposed adjacent to said first member;

a plurality of guides disposed in pairs along the sides of said first member and said second member wherein one guide in each pair is on said first member and the other guide is one said second member;

and a plurality of third members responsive to actuation by a finger or other operator for reciprocating between a pair of said guides from a first position to a second position, said third members being adapted to move said first member when in said first position and an adjacent third member is in said second position.

13. A device in accordance with claim 12 wherein said third members define small openings between adjacent third members when said third members are disposed in said first position and a large opening between two third members when said two third members are disposed in said first position and are separated by a third member disposed in said second position.

14. In a dialing device, the combination comprising:

a housing an opening circumscribed by a plurality of grooves;

a center piece disposed in said opening and having a plurality of grooves disposed around its periphery, each groove on said center piece being opposite to and extending in the same direction as a groove on said housing;

and a plurality of members slidable from a first position to a second position, each of said members being disposed between opposite grooves on said housing and said center piece and being flush with adjacent members when in said first position and being depressed below adjacent members when in said second position, said members each having two sides curved to follow the contour of said opposite grooves and two sides curved to extend the contour of adjacent grooves whereby small openings appear between adjacent members which are disposed in said first position and a large opening appears between two members which are disposed in said first position and which are separated by a member disposed in said second position.

15. In a dialing device, the combination comprising:

a first member;

a second member;

and a plurality of third members extending between said first and second members in an array wherein said third members are spaced from each other by small openings, each of said third members having a curved center portion and being adapted to rotate in a reciprocal manner through an arc of 90 degrees in response to an inserted finger or other operator, said rotation being in a direction away from said inserted finger or other operator whereby the small opening therebetween is enlarged to accommodate said inserted finger or operator.

16. In a dialing device, the combination comprising:

a cylinder housing;

a hub, said hub being disposed centrally within said housing;

a plurality of spoke members radiating out from said hub and having one end fastened to said hub and the other end fastened to said housing, said spoke members being disposed around said hub and being separated from each other by a plurality of spaces, said spoke members each having a curved portion for cooperating with the curved portion of an adjacent spoke member to enlarge the space between said adjacent spoke members by rotating in response to the insertion therebetween of a finger or other operator.

No references cited.

KATHLEEN H. CLAFFY, *Primary Examiner.*

A. H. GESS, *Assistant Examiner.*